United States Patent [19]

McKeown

[11] Patent Number: 5,063,612
[45] Date of Patent: Nov. 5, 1991

[54] NETWORK TRANSCEIVER

[75] Inventor: Nicholas W. McKeown, Berkeley, Calif.

[73] Assignee: Hewlett-Packard Company, Palo Alto, Calif.

[21] Appl. No.: 562,333

[22] Filed: Aug. 3, 1990

[30] Foreign Application Priority Data

Aug. 11, 1989 [EP] European Pat. Off. ........ 89308191.9

[51] Int. Cl.$^5$ ............................................ H04B 10/08
[52] U.S. Cl. .................................... 455/607; 455/343; 455/600; 455/612
[58] Field of Search .................. 455/67, 115, 343, 606, 455/607, 609, 610, 611, 612, 613, 617–618; 370/74, 13

[56] References Cited

U.S. PATENT DOCUMENTS

| | | | |
|---|---|---|---|
| 4,641,375 | 2/1987 | Dean | 455/607 |
| 4,731,880 | 3/1988 | Ault | 455/607 |
| 4,777,661 | 10/1988 | Spillman | 455/608 |
| 5,003,619 | 3/1991 | Morris | 455/343 |

*Primary Examiner*—Curtis Kuntz
*Assistant Examiner*—L. Pascal
*Attorney, Agent, or Firm*—Woodcock Washburn Kurtz Mackiewicz & Norris

[57] ABSTRACT

A transceiver is provided for a station of a network of the type in which a plurality of stations are connected via links to a network common point through which a transmission received from any of the stations passes on its way to any other of the stations. The transceiver includes adjustment means for setting the output power level of the transceiver transmitter. The adjustment means is operative, when the transceiver is in a calibration mode, to measure the attenuation in the station/common point link by monitoring the transmitted and received power levels of a calibration signal. Thereafter, the transmitter output power level is set such as to bring about a desired power level at the network common point, this desired level being specified by a reference signal. By arranging for all transceivers to produce the same power level at the network common point, collision detection at each station is facilitated since in the event of two transmissions colliding, the received power will be double the normal received level. This power-level setting technique is particularly suitable for optical networks with passive star couplers, the latter constituting the aforesaid network common point.

11 Claims, 3 Drawing Sheets

NETWORK TRANSCEIVER

BACKGROUND OF THE INVENTION

1. Field of the Invention

The present invention relates to a transceiver for a station of a network of the type in which a plurality of stations are connected via links to a network common point through which a transmission received from any of the stations passes on its way to all the stations, and in particular, but not exclusively, the present invention relates to optical transceivers for use in optical star networks incorporating passive star couplers.

2. Description of the Prior Art

In optical star networks with passive star couplers, the network stations are often arranged to operate autonomously, that is, without any common control. In this event, some form of collision detection is generally required to enable the stations to recognize a clash between two or more stations that start transmitting concurrently. An appropriate network protocol for such a situation would be a CSMA/CD (Carrier-Sense, Multiple Access/Collision Detection) protocol such as Ethernet. Collision detection is generally the responsibility of each station undertaking transmission, and upon detection of a collision, the detecting station is arranged to output a jam tone over the network to warn all other stations.

In coaxial-cable CSMA/CD LANS, collision detection is simple to implement. The transmissions from each station contain a d.c. voltage component. During transmission, each station monitors the line, watching for changes in the d.c. voltage level. If such a change occurs, then a collision can be assumed to have taken place. This technique works well because the d.c. attenuation of the medium is small over the length of a single link and the transmission of each station is designed to give a uniform output.

Collision detection in an optical star network with a passive star coupler is, however, considerably more difficult because variations in link attenuation and transmitter output make collision difficult to detect. For example, consider an optical network with link lengths of 0–500 m, a fibre attenuation of 3 dB/km, and LED transmitters with an average power output of $-10$ dBm$+2$ dB. The star coupler of the network is assumed to have an attenuation of 20 dB$+2$ dB. In such a network, a station close to the star coupler may receive $-26$ dBm of optical power from its own transmitter, but only $-35.5$ dBm of optical power from the transmitter of a more distant station. To detect a collision between itself and the more distant station, the station must be able to recognize that there are two simultaneous optical signals 10 dB apart, which is not easily achieved.

European Patent Application No. 0,216,214 (Siemens) describes an optical network with a passive star coupler in which each station has an optical transceiver that is operative both in a normal mode, in which it serves for the transmission and reception of data over the network, and in a calibration mode. The transceiver includes an optical transmitter the output level of which is adjustable, an optical receiver, and adjustment means connected to the transmitter and operative when the transceiver is in its calibration mode to set the output power level of the transmitter such that the resultant optical power produced at the star coupler of the network is at the same level for all stations. By setting the transmitter output power level to achieve this result, the received power level at any particular station will be the same regardless of which station is transmitting. Thus, should two stations transmit simultaneously, the power received at any station will be double, which, of course, is easily detectable.

Although the approach adopted in the foregoing European Application overcomes the problem of needing to detect signals of vastly different strengths when effecting collision detection, the calibration process effected by the adjustment means of the station transceiver is somewhat complex. More particularly, the transceivers must all be set into their calibration mode together, and thereafter the adjustment means of the transceivers carry out the following two calibration phases:

1. Each transmitter in turn sends out a calibration signal at maximum power and the received power level at each station is monitored; the adjustment means of each transceiver then operates to store the lowest received power level it has monitored during this first phase.
2. Next, each transceiver in turn activates its transmitter and then reduces its output power level until the power level at its receiver equals the value of the lowest received power level stored in the first phase. The overall effect is that the power level produced at the star coupler by each transmitter will be the same.

It will be apparent to those skilled in the art that the foregoing calibration process suffers from a number of disadvantages, the most notable being the need for the participation of all transceivers (so that each time a new station joins the network, the calibration process must be repeated) and the need for the transceivers to operate in turn and to listen to all other transceivers (which either requires each transceiver to have a table of all other stations or for inefficient assumptions to be made regarding the number of stations present always being the maximum).

SUMMARY OF THE INVENTION

It is accordingly an aspect of the present invention to provide a transceiver with improved adjustment means that facilitate setting the transmitter output to produce a desired power level at the star coupler.

According to one such aspect of the present invention, there is provided an optical transceiver for a station of an optical star network with a passive star coupler, the transceiver having adjustment means for setting the output power level of the transceiver transmitter and comprising:

first monitoring means for generating a first power-level signal indicative of the output optical power level of the transmitter, second monitoring means for generating a second power-level signal indicative of the received optical power level at a receiver of the transceiver, reference setting means for providing a reference signal indicative of a desired optical power level at the star coupler of the network, and control means operative, when the transceiver is in a calibration mode, to adjust the output of the transmitter using an optical calibration signal, the optical calibration signal being determined by utilizing said first and second power-level signals and the reference signal to determine the transmitter output power level required to produce an optical power level at the star coupler corresponding to the level represented by the reference signal, the control means thereafter setting the transmitter output power level to this determined level using the optical calibration signal.

By measuring the transmitted and received power levels, it is possible in accordance with the invention to determine the attenuation caused by the optical link connecting the transceiver to the star coupler (in a preferred embodiment, an explicit attenuation signal value is generated). With the link attenuation known, the output power level required to produce the star-coupler power level represented by the reference signal can be determined.

It will be appreciated by those skilled in the art that the transceiver operates to set its transmitter output power level independently of other stations on the network, the reference signal providing the controlling input. As a result, a station incorporating the transceiver can be added to the network without thereby requiring all the other stations to partake in a calibration process. It is therefore unnecessary for the transceiver to have any knowledge of what other stations are connected to the network.

The reference signal represents a desired power level at the star coupler. Of course, the reference signals of the transceivers of all network stations should represent the same desired power level if collision between two transmissions is to result in the doubling of the power level at each receiver. The present invention should not, however, be considered as limited to transceivers for optical networks relying on collision detection, as the ability to set the power level produced at the star coupler can be used to advantage for other purposes; for example, a power-level monitor can be provided at the star coupler to produce an alarm signal upon detection of transmissions having a power level below the predetermined reference value.

Preferably, the transmitter of the transceiver comprises a laser transmitter device provided with a back-facet photodiode, this photodiode being used as the first monitoring means of the adjustment means.

Advantageously, when the transceiver is in its calibration mode, the control means is operative to cause the optical calibration signal to be transmitted a plurality of times in succession, the control means, in determining the transmitter output power level, utilizing that one of the resulting second power-level signals that represents the lowest received power at the receiver. The purpose of this procedure is to take account of the fact that the calibration signal may collide with a transmission from another station, and until the transceiver transmitting the calibration signal has been calibrated, it will not be able to detect such a collision. By transmitting the calibration signal several times in close succession, it is very unlikely that all such transmissions will collide with other transmissions so that taking the lowest-power received signal should provide a collision-free measurement of received power.

The present invention also provides optical networks of the aforesaid type incorporating the transceivers of the invention. These transceivers can advantageously be arranged not only to enter their calibration mode when the network is first started up, but also at intervals thereafter. As already noted, when a new station is added, it will carry out calibration of its transmitter without requiring the cooperation of the other stations.

In fact, the present invention can be applied to any optical network having a network common point through which a transmission from any station passes on its way to all stations. In this case, the control means utilizes the reference signal to produce a desired optical power level at the aforesaid network common point (this point being constituted by the passive star coupler in the previously-considered implementation of the invention). Furthermore, the present invention also has application to non-optical networks where it is desired to set power levels at a network common point.

BRIEF DESCRIPTION OF THE DRAWINGS

An optical transceiver embodying the present invention will now be described, by way of non-limiting example, with reference to the accompanying drawings, in which.

DETAILED DESCRIPTION OF THE INVENTION

Figure 1:
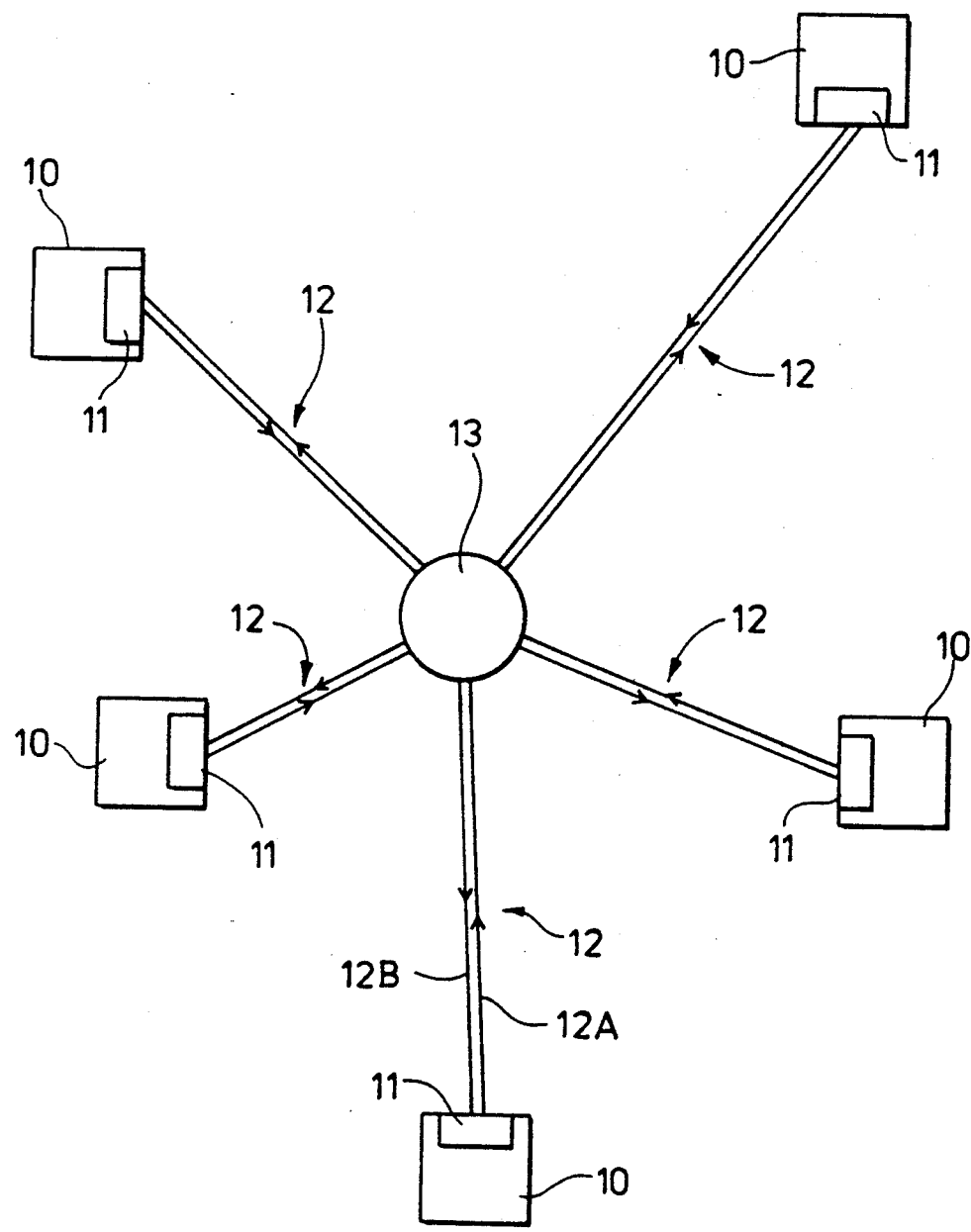
FIG. 1 is a diagram illustrating the general form of a star-configured optical network in which a plurality of stations are linked through a passive optical coupler.

FIG. 1 illustrates a star-configured optical network in which a plurality of stations 10, each with a respective optical transceiver 11, communicate via respective optical links 12 with a star coupler 13. Each optical link comprises a transmit line 12A and a receive line 12B. The star coupler 13 serves to distribute a transmission received from any one of the stations 13 on the corresponding transmit line 12A to the receive lines 12B of all the stations 10, including the station that originated the transmission. As far as practical, the power of the incoming transmission is distributed equally between the receive lines 12B.

The network operates, in the present example, according to a CSMA/CD protocol and typically has a size of 1 to 2 Km in diameter, a data rate of 10Mbps, and up to thirty-two stations (one or more of which could be a repeater/bridge to another, similar network).

Figure 2:
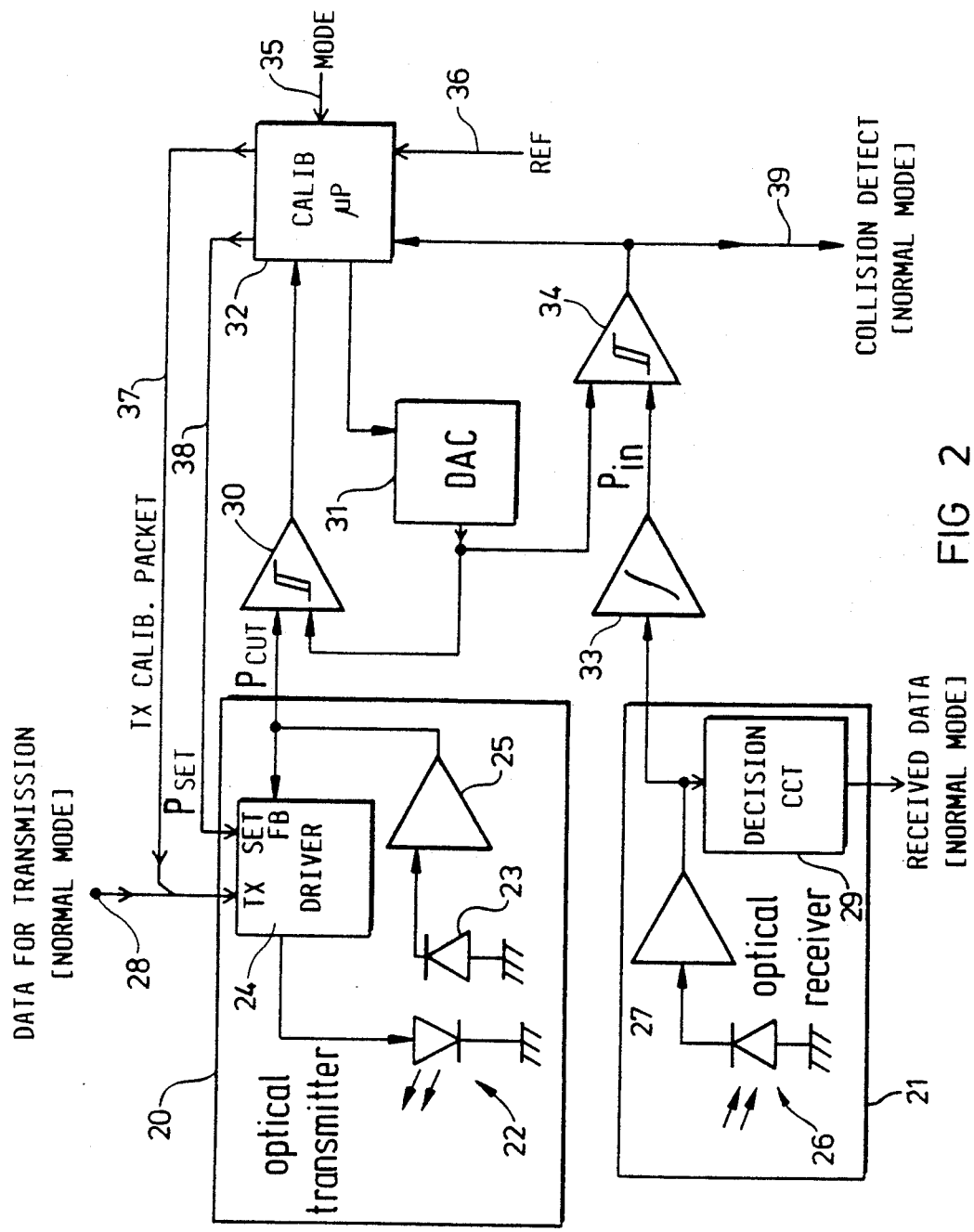
FIG. 2 is a schematic diagram of an optical transceiver for a station of the FIG. 1 network.

FIG. 2 shows the details of one of the station transceivers 11, the other transceivers being of the same form. The transceiver 11 comprises an optical transmitter 20, the output power level of which is adjustable, an optical receiver 21, and adjustment means 30 to 39. The transceiver 11 is arranged to operate in two modes, namely:

a calibration mode in which the adjustment means sets the output power level of the transmitter 20 to a level such as to produce a desired power level at the star coupler 13, and a normal mode in which the transceiver 11 is operative both to transmit data received on a line 28 and to receive data from its link 12 and output it via decision circuitry 29, the adjustment means serving in this mode to provide collision detection.

The optical transmitter 20 comprises a laser diode device 22, a driver circuit 24 arranged to drive the laser diode device 22 in dependence on signals received at its transmit input TX, a back-facet monitor photodiode 23 associated with the laser diode device 22, and an amplifier 25 fed with the output of the monitor photodiode 23 and connected to a feedback input FB of the driver circuit 24. The driver circuit 24 also has an output-power-level setting input SET by means of which a desired output power level can be set. The monitor photodiode 23 measures the actual optical output power level of the laser diode device 22 and provides a feedback signal to the driver circuit to facilitate the setting of the output power to the desired level specified by a signal supplied to the input SET of the driver.

The optical receiver 21 comprises a receiving photodiode 26 connected to the input of a transimpedance amplifier 27, the output of which feeds decision circuitry 29.

The transmitter 20 and receiver 21 are of standard design and will therefore not be described in more detail herein.

The adjustment means of the transceiver 11 includes control means in the form of a microprocessor 32. The microprocessor 32 is fed with a mode-control signal on line 35 to set the adjustment means (and hence the transceiver) to operate in one or the other of the aforesaid normal and calibration modes. When the adjustment means of the transceiver 11 is set into its calibration mode, the microprocessor 32 is arranged to cause the transmitter 20 to output an optical calibration signal and then to derive in respect of this signed, digital values representing the output power level of the transmitter 20 and the received power level at the receiver 21. The microprocessor 32 causes the output of such a calibration signal by feeding a calibration packet over line 37 to the transmit input TX of the driver circuit 24. This packet is a square wave (successive '01' pairs) which is long enough in duration to ensure that the receiver 21 detects the incoming square wave before the transmitter 20 stops transmitting.

In measuring the transmitter output power level during transmission of the calibration packet, advantage is taken of the fact the output power level $P_{out}$ is available in analog form at the output of the amplifier 25. To convert this to a digital value, the output of the amplifier 25 is connected to a comparator 30 which is also fed with the analog output of a digital-to-analog converter 31, the input of which is controlled by the microprocessor 32. The output of the comparator 30 is connected to an input of the microprocessor 32. A digital measure of $P_{out}$ is obtained by the microprocessor 32 progressively increasing the digital value fed to the converter 31 until the output of the comparator 30 changes state at which point the digital value provided to the converter is taken as the digital value of $P_{out}$. Alternatively, a successive binary approximation technique may be used.

A digital value representing the received power level $P_{in}$ is obtained in a similar way with the output of the receiver amplifier 27 being first integrated in an integrating amplifier 33 before being fed to a comparator 34 which, like the comparator 30, is also fed with the output of the converter 31. The output of the comparator 34 feeds an input of the microprocessor 32. To measure the received power level, the microprocessor 32 progressively increases the digital value fed to the converter 31 until the output of the comparator 34 changes state, the current value of the input to the converter 31 being then taken as the digital value of the received power level $P_{in}$ (again, a successive binary approximation technique may be used instead). Measurement of $P_{out}$ and $P_{in}$ of course takes place sequentially as both operations require the use of the converter 31.

Having derived digital values for $P_{out}$ and $P_{in}$, the microprocessor 32 then derives a value A for the optical attenuation in the outward path over line 12A to the star coupler 13, this value being determined according to the following formula:

$$A = \tfrac{1}{2}(P_{out} - P_{in})$$

The foregoing formula assumes that the optical attenuation on the outward path matches the loss on the return path. Furthermore, the measured value of $P_{out}$ must be calibrated with respect to $P_{in}$. This can be achieved by careful design or by manual calibration.

The microprocessor utilizes the outward-path attenuation value A to determine the transmitter output power level $P_{set}$ necessary to achieve a required power level $P_{reqd}$ at the star coupler 13, the value of $P_{reqd}$ being specified by a reference signal REF fed to the microprocessor 32 over line 36 and stored digitally in a memory of the microprocessor. The value of $P_{set}$ is determined according to the formula:

$$P_{set} = P_{reqd} + A$$

Having determined $P_{set}$, the microprocessor 32 outputs a corresponding signal on line 38 to the SET input of the driver 24, thus setting the output power level to $P_{set}$.

The calculation of $P_{in}$, $P_{out}$, A and $P_{set}$ need not be particularly fast (a few milliseconds will generally not adversely affect network performance).

By arranging for $P_{req}$ to be the same for all transceivers 11, once all transceivers have carried out the above-described calibration process, they will all produce the same power level at the star coupler 13. A consequence of this is that for any given station, the received power level will be the same for any single received transmission, regardless of which station it originates from. Furthermore, should two transmissions collide, the received power level at each station will be double the normal received level at that station and this enables all stations to readily detect the collision.

The circuitry of the adjustment means of the transceiver 11 can also be used for collision detection purposes when the transceiver is operating in its normal mode. This is achieved by arranging for the microprocessor 32 to output to the converter 31 a digital value just in excess of the expected received power level for a single transmission (this level being $P_{req} - A$). If now the actual received power level exceeds the expected level, the comparator 34 will change its output state and indicate a collision.

Generally, when a station is first connected to the network or the network is first started up, the station transceiver will be set in its calibration mode to set the transmitter output power level. Once this has been done, the transceiver is put into its normal mode. Preferably, the transceiver will from time to time be returned to its calibration mode to set the transmitter output power level. It should be noted by those skilled in the art that as the calibration process does not require the assistance of other stations, the addition of a new station can be done without disturbing network operation.

Of course, when a station is first connected to the network, or the network is first started up, the transceiver will not be in a position to make a judgment regarding collisions. It is therefore possible in accordance with the invention that the calibration packet sent out by the transceiver when in its calibration mode may collide with a transmission from another station and give rise to a falsely high received power level measurement. To overcome this potential difficulty, the microprocessor 32 causes the calibration packet to be transmitted several times in succession in a random manner (for example, the calibration packet may be transmitted five times, each transmission occurring at random within a fixed time window, typically of one second duration). For each transmission of the calibration packet, the received power level is measured and at the end of the series of transmissions, the lowest received power level reading is taken as representing $P_{in}$. With the typical network parameters given hereinbefore, it can be shown statistically that the chances of a collision occurring during every transmission of the calibration packet are small.

Where a transceiver has already gone through the calibration process, it is not necessary to effect a multiple transmission of the calibration packet when a re-calibration is undertaken. The reason for this is that the transceiver can detect the occurrence of a collision should one occur and initiate re-sending of the calibration packet only in such circumstances.

Various modifications to the above-described transceiver are, of course, possible. Thus, for example, the attenuation value A need not be explicitly derived in the determination of $P_{set}$. Furthermore, the determination of $P_{set}$ can be effected by analog processing circuitry instead of the described digital processing circuitry.

Figure 3:
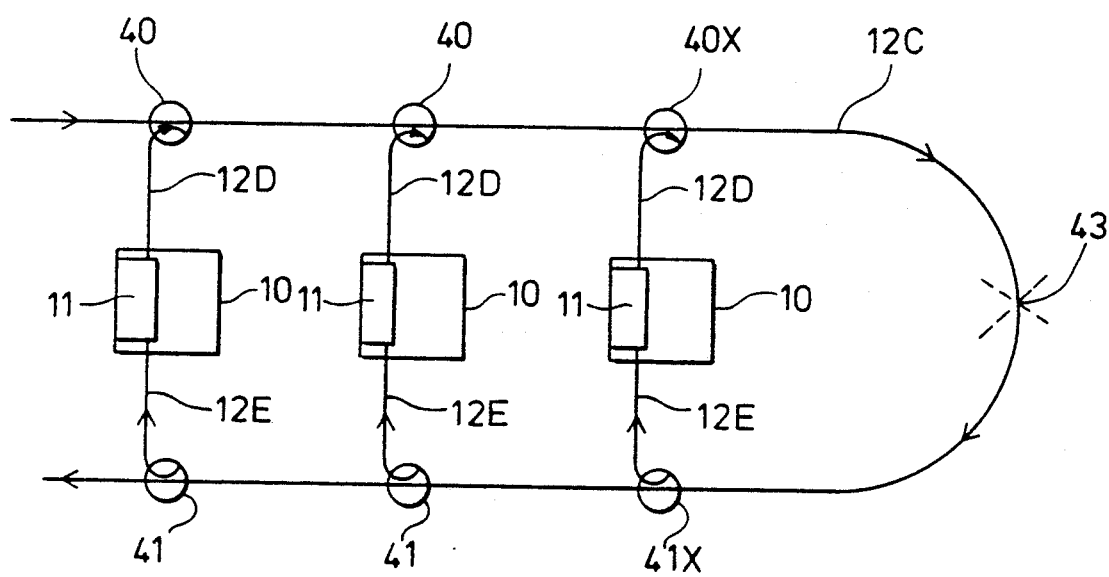
FIG. 3 is a diagram illustrating the form of a more general type of network to which the present invention may be applied.

Additionally, the FIG. 2 optical transceiver can be used with advantage not only with star networks with passive star couplers, but generally with optical networks having a network common point through which a transmission from any station passes on its way to all other stations (in the case of star networks, the star coupler provides such a network common point). FIG. 3 shows a non-star network configuration in connection with which the FIG. 2 transceiver can be used with advantage.

In the FIG. 3 network configuration, each network station 10 has its transceiver 11 connected to a main optical line 12C by a transmit line 12D and associated uni-directional optical coupler 40 and by a receive line 12E and associated uni-directional optical coupler 41. Optical signals transmitted by the transceiver 11 of each station 10 pass in a clockwise direction around the loop of line 12C such that the transmissions of all stations fed to the upper pass of line 12C are coupled back to all stations over the lower pass of line 12C. The mid-point 43 on the section of line 12C between couplers 40X and 41X can be considered as a network common point as transmissions from all stations pass through this point on their way to all stations. The transceivers 11 act in the manner already described to set a desired power level, as determined by the reference signal, at the network common point 43.

It should be noted that the determination of the attenuation value A described above in relation to the FIG. 2 transceiver assumes that the network common point is located halfway along the round-trip link between the transceiver transmitter port and the transceiver receiver port. This will generally be true in relation to optical star networks as the transmit and receive lines will normally follow the same route. Furthermore, for the network configuration shown in FIG. 3, choosing the network common point as the mid-point on the arc between couplers 40X and 41X will generally place the common point at the halfway position between the transmit and receive ports for all the transceivers. However, it is not essential that this be the case provided that an appropriate adjustment is made in calculating the attenuation value A between the transceiver transmitter port and the point of the network chosen as a network common point. Thus, for example, if the network common point is, by choice or of necessity, only one-third of the way along the round-trip loop between a transceiver transmitter port and its receive port, then in calculating the appropriate attenuation value A, the difference between the values of $P_{out}$ and $P_{in}$ is divided by three (rather than by two as in the previously given example). Of course, in the event that the ratio of the line length between a transceiver transmit port and the network common point and the line length between the transceiver receive port and the network common point is not the same for all transceivers, then it will be necessary to set up each transceiver individually to derive an appropriate value A for the attenuation in the transmit port/network common point line.

The power-level setting technique described above may also be applied to suitable non-optical networks. Accordingly, all such modifications are included within the scope and spirit of the invention as defined in the appended claims.

What is claimed is:

1. A transceiver for a station of a network of the type in which a plurality of stations are connected via links to a network common point through which a transmission received from any one of said stations passes on its way to any other of said stations, said transceiver being operative both in a normal mode, in which it serves for the transmission and reception of data over said network, and in a calibration mode, and comprising:

a transmitter with an adjustable output power level;

a receiver; and adjustment means connected to said transmitter and operative when the transceiver is in said calibration mode to set the output power level of said transmitter such that the resultant power produced at said network common point is at a desired level, said adjustment means comprising:

first monitoring means for generating a first power level signal indicative of the output power level of said transmitter, second monitoring means for generating a second power-level signal indicative of the received power level at said receiver, reference setting means for providing a reference signal indicative of a desired power level at said network common point, and control means connected to receive said first and second power-level signals and said reference signal, said control means being operative, when the transceiver is in said calibration mode, to adjust the output of said transmitter using a calibration signal determined by utilizing said first and second power-level signals and the reference signal to determine the transmitter output power level required to produce a power level at said network common point corresponding to the level represented by the reference signal and thereafter setting the transmitter output power level to this determined level using said calibration signal.

2. A transceiver according to claim 1, wherein said control means is operative to derive from said first and second power-level signals produced after said adjustment by said calibration signal an attenuation signal representative of the attenuation present in the link connecting said transmitter to said network common point, the control means combining said reference and attenuation signals to determine the required transmitter output power-level.

3. A transceiver according to claim 1, wherein said first and second monitoring means generate said first and second power-level signals in analog form and said control means includes converter means operative to convert said analog power-level signals into digital values, said reference setting means comprising digital storage means for storing a digital value constituting said reference signal, and said control means being further operative to process said digital values that correspond to said first and second power-level signals and said reference signals so as to determine the required power level setting of said transmitter.

4. A transceiver according to claim 1, wherein when the transceiver is in said calibration mode said control means causes said calibration signal to be transmitted a plurality of times in succession, said control means further determining the transmitter output power level utilizing a one of the resulting second power-level signals that represents the lowest received power at said receiver.

5. A transceiver according to claim 4, wherein each transmission of said calibration signal occurs randomly within a respective predetermined time window.

6. A transceiver according to claim 1, wherein said network is an optical star network of the type in which said network common point is a passive star coupler.

7. A transceiver according to claim 6, wherein said transmitter comprises a laser transmitter device for transmitting optical signals over said optical star network and said first monitoring means comprises a back-facet monitor photodiode for monitoring said transmitted optical signals.

8. An optical network comprising a plurality of stations, a passive star coupler, and a plurality of optical links connecting said stations to said passive star coupler, the star coupler being operative to distribute a transmission received from any one of said stations to any other of said stations, each said station having an optical transceiver operative both in a normal mode, in which it serves for the transmission and reception of data over said network, and in a calibration mode, said transceiver comprising:

a transmitter with an adjustable output power level;

a receiver; and adjustment means connected to said transmitter and operative when the transceiver is in said calibration mode to set the output power level of said transmitter such that the resultant power produced at said star coupler for all transceivers is at a desired level, said adjustment means comprising:

first monitoring means for generating a first power level signal indicative of the output power level of said transmitter, second monitoring means for generating a second power-level signal indicative of the received power level at said receiver, reference setting means for providing a reference signal indicative of a desired power level at said star coupler for all transceivers, and control means connected to receive said first and second power-level signals and said reference signal, said control means being operative, when the transceiver is in said calibration mode, to adjust the output of said transmitter using a calibration signal determined by utilizing said first and second power-level signals and the reference signal to determine the transmitter output power level required to produce a power level at said star coupler for all transceivers corresponding to the level represented by the reference signal and thereafter setting the transmitter output power level to this determined level using said calibration signal.

9. An optical network according to claim 8, wherein upon first start up of the network, the transceivers of all connected stations initially enter their calibration modes to set their transmitter output power levels and thereafter enter into their normal modes.

10. An optical network according to claim 8, wherein upon addition of a new station to said network, the transceiver of the new station enters its calibration mode to set its transmitter output power level and thereafter enters its said normal mode, the existing stations of the network continuing to operate as before and without regard to the mode of operation of the new station.

11. An optical network according to claim 8, wherein the transceiver of each said station is operative to enter its calibration mode at predetermined intervals to reset its transmitter output power level.

* * * * *